United States Patent
Ling et al.

(10) Patent No.: US 9,043,855 B2
(45) Date of Patent: May 26, 2015

(54) NOISE SUPPRESSION IN A HYBRID FIBER COAXIAL NETWORK

(71) Applicant: MaxLinear, Inc., Carlsbad, CA (US)

(72) Inventors: Curtis Ling, Carlsbad, CA (US); Sridhar Ramesh, Carlsbad, CA (US); Timothy Gallagher, Encinitas, CA (US)

(73) Assignee: MaxLinear, Inc., Carlsbad, CA (US)

( * ) Notice: Subject to any disclaimer, the term of this patent is extended or adjusted under 35 U.S.C. 154(b) by 0 days.

(21) Appl. No.: 13/948,417

(22) Filed: Jul. 23, 2013

(65) Prior Publication Data

US 2014/0026176 A1   Jan. 23, 2014

Related U.S. Application Data

(60) Provisional application No. 61/674,737, filed on Jul. 23, 2012.

(51) Int. Cl.

| | |
|---|---|
| *H04N 7/173* | (2011.01) |
| *H04B 17/00* | (2006.01) |
| *H04N 21/6338* | (2011.01) |
| *H04N 21/61* | (2011.01) |
| *H04N 21/647* | (2011.01) |
| *H04H 60/97* | (2008.01) |
| *H04H 20/78* | (2008.01) |
| *H03D 1/04* | (2006.01) |
| *H04B 1/10* | (2006.01) |
| *H04H 60/32* | (2008.01) |

(52) U.S. Cl.
CPC ....... *H04N 21/6338* (2013.01); *H04N 21/6118* (2013.01); *H04N 21/64761* (2013.01); *H04N 21/6168* (2013.01); *H04N 21/64769* (2013.01); *H04H 60/32* (2013.01); *H04H 60/97* (2013.01); *H04H 20/78* (2013.01); *H04N 21/6156* (2013.01)

(58) Field of Classification Search
CPC .......... H04N 21/6118; H04N 21/6168; H04N 21/6156; H04N 21/6332; H04N 21/64753; H04N 21/64761; H04N 21/64769; H04H 60/32; H04H 60/97; H04H 20/78
USPC .......... 725/124, 127, 111, 117, 125; 375/227, 375/346, 351
See application file for complete search history.

(56) References Cited

U.S. PATENT DOCUMENTS

| | | | |
|---|---|---|---|
| 6,567,987 B1 * | 5/2003 | Farhan et al. | 725/125 |
| 6,772,437 B1 * | 8/2004 | Cooper et al. | 725/111 |
| 2005/0010958 A1 * | 1/2005 | Rakib et al. | 725/111 |
| 2005/0246754 A1 * | 11/2005 | Desai et al. | 725/118 |
| 2005/0259668 A1 * | 11/2005 | Kim | 370/401 |
| 2006/0029090 A1 * | 2/2006 | Bione | 370/419 |
| 2007/0169162 A1 * | 7/2007 | Kola | 725/117 |
| 2009/0007210 A1 * | 1/2009 | Nishide et al. | 725/125 |
| 2010/0223651 A1 * | 9/2010 | Wang | 725/125 |
| 2013/0091533 A1 * | 4/2013 | Wells et al. | 725/149 |

* cited by examiner

*Primary Examiner* — Hoang-Vu A Nguyen-Ba
(74) *Attorney, Agent, or Firm* — McAndrews, Held & Malloy, Ltd.

(57) ABSTRACT

A coupling device for use in a hybrid fiber coaxial (HFC) network may be configured to disable an upstream path through it when there is only noise incident on the upstream path, and enable the upstream path through it when a desired transmission from a cable modem downstream of the coupling device is incident on the upstream path. The coupling device may be a trunk amplifier, a distribution amplifier, a splitter, or the like. The coupling device may comprise a single upstream interface coupled to a plurality of downstream interfaces. The enabling and/or disabling may be in response to a signal strength indicated by the SSI being below a threshold and/or in response to one or more control messages indicating whether any downstream cable modem is, or will be, transmitting.

18 Claims, 7 Drawing Sheets

NOISE SUPPRESSION IN A HYBRID FIBER COAXIAL NETWORK

PRIORITY CLAIM

This patent application makes reference to, claims priority to and claims benefit from U.S. Provisional Patent Application Ser. No. 61/674,737 titled "Method and System for a Noise Suppression in a Cable Television Network" and filed on Jul. 23, 2012.

The entirety of the above-mentioned application is hereby incorporated herein by reference.

INCORPORATION BY REFERENCE

This application also makes reference to:

U.S. Patent Application Publication No. 2013/0094416 titled "Method and System for Client-Side Message Handling in a Low-Power Wide Area Network," and filed on Jul. 19, 2012;

United States Patent Application Publication No. 2013/0097240 titled "Method and System for Server-Side Message Handling in a Low-Power Wide Area Network," and filed on May 31, 2012;

United States Patent Application Publication No. 2013/0094551 titled "Method and System for a Low-Power Client in a Wide Area Network," and filed on Jul. 19, 2012;

United States Patent Application Publication No 2013/0094415 titled "Method and System for Server-Side Handling of a Low-Power Client in a Wide Area Network," and filed on Jul. 19, 2012;

United States Patent Application Publication No. 2014/0022926 titled "Method and System for a High Capacity Cable Network," and filed on Jul. 23, 2013; and United States Patent Application Publication No. 2014/0022943 titled "Method and System for Service Group Management in a Cable Network," and filed on Jul. 23, 2013.

The entirety of each of the above-mentioned applications is hereby incorporated herein by reference.

FIELD OF THE INVENTION

Certain embodiments of the invention relate to cable television networks. More specifically, certain embodiments of the invention relate to a method and system for noise suppression in a cable television network.

BACKGROUND OF THE INVENTION

Convention cable television networks can be inefficient and have insufficient capacity. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for noise suppression in a cable television network, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Figure 1:
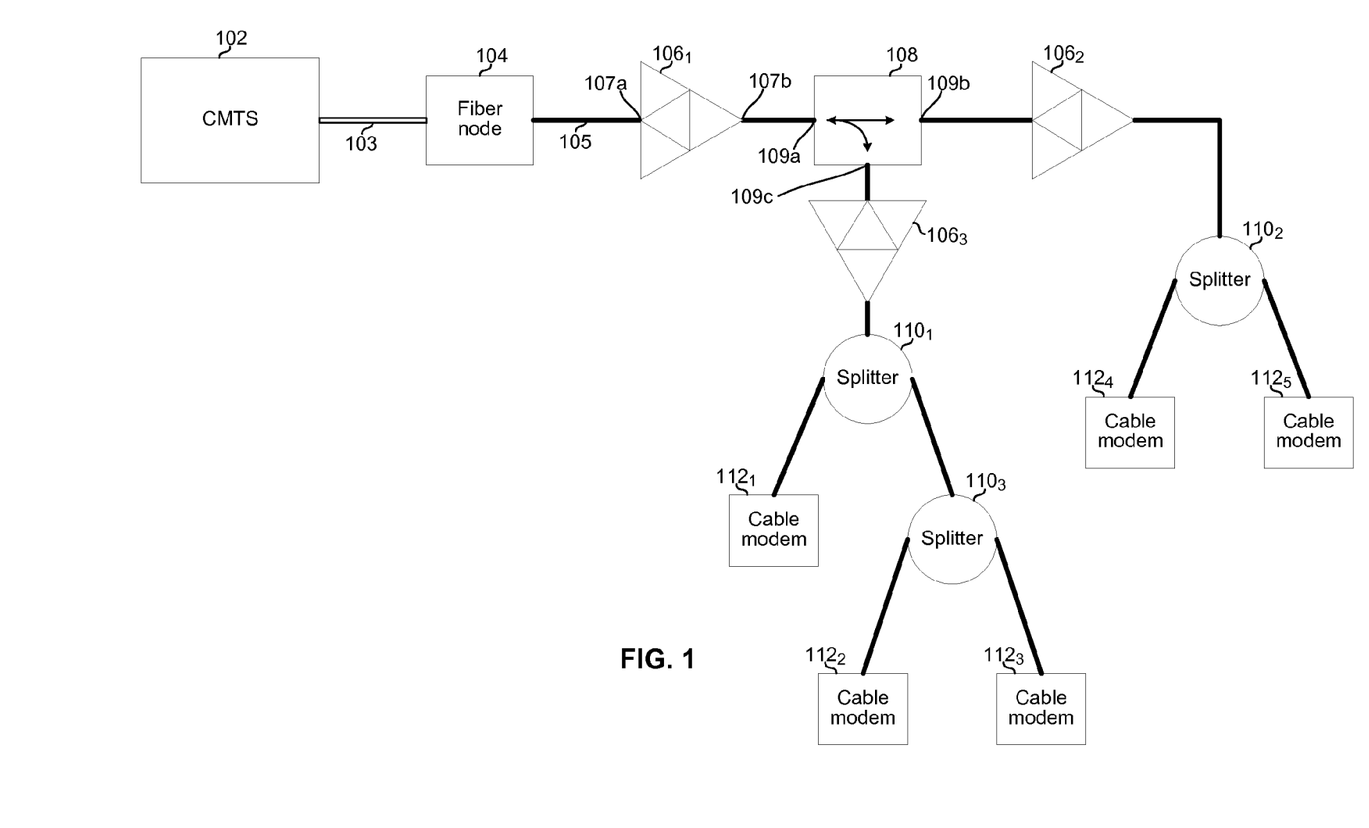
FIG. 1 is a diagram of an example cable/DOCSIS network.

FIG. 1 is a diagram of an example cable/DOCSIS network. The example network comprises a cable modem termination system (CMTS) 102, a fiber node 104, amplifiers $106_1$-$106_3$, a directional coupler 108, splitters $110_1$-$110_3$, and cable modems (CMs) $112_1$-$112_5$.

The CMTS 102 may comprise circuitry operable to manage connections to the CMs $112_1$-$112_5$. This may include, for example: participating in ranging operations to determine physical layer parameters used for communications between the CMTS 102 and CMs $112_1$-$112_5$; forwarding of dynamic host configuration protocol (DHCP) messages between a DHCP server and the CMs $112_1$-$112_5$; forwarding of time of day messages between a time of day server and the CMs $112_1$-$112_5$; directing of traffic between the CMs $112_1$-$112_5$ other network devices (e.g., Ethernet interfaces of the CMTS 102 may face the Internet, Optical RF interfaces of the CMTS 102 may face the CMs, and the CMTS may direct traffic between and among the Ethernet and Optical RF interfaces); and managing registration of the CMs $112_1$-$112_5$ to grant the cable modems network (e.g., Internet) access. The registration process for a CM 112 may comprise the CM 112 sending a registration request along with its configuration settings, and the CMTS 102 accepting or rejecting the cable modem based on the configuration settings. The registration process may additionally comprise an exchange of security keys, certificates, or other authentication information.

The fiber node 104 may comprise circuitry operable to convert between optical signals conveyed via the fiber optic cable 103 and electrical signals conveyed via coaxial cable 105.

Each of the amplifiers $106_1$-$106_3$ may comprise a bidirectional amplifier which may amplify downstream signals and upstream signals, where downstream signals are input via upstream interface 107a and output via downstream interface 107b, and upstream signals are input via downstream interface 107b and output via upstream interface 107a. The amplifier $106_1$, which amplifies signals along the main coaxial "trunk," may be referred to as a "trunk amplifier." The amplifiers $106_2$ and $106_3$, which amplify signals along "branches" split off from the trunk, may be referred to as "branch" or "distribution" amplifiers.

The directional coupler 108 may comprise circuitry operable to direct downstream traffic incident on interface 109a onto interfaces 109b and 109c, and to direct upstream traffic incident on interfaces 109b and 109c onto interface 109a. The directional coupler 108 may be a passive device.

Each of the splitters $110_1$-$110_3$ may comprise circuitry operable to output signals incident on each of its interfaces onto each of its other interfaces. Each of the splitters $110_1$-$110_3$ may be a passive device.

Each of the cable modems (CMs) $112_1$-$112_5$ may comprise circuitry operable to communicate with, and be managed by, the CMTS 1102 in accordance with one or more standards (e.g., DOCSIS). Each of the CMs $112_1$-$112_5$ may reside at the premises of a cable subscriber.

The components (including, fiber optic cables, coaxial cables, amplifiers, directional couplers, splitters, and/or other devices between the CMTS and the CMs may be referred to as a hybrid fiber coaxial (HFC) network. Any of the amplifiers, directional couplers, and splitters may be referred to generically as a coupling device.

Referring to FIG. 2A, there is again shown the cable network of FIG. 1. In FIG. 2, however, in FIG. 2A additional details of the amplifiers $106_1$-$106_3$ are shown. Specifically, each of the amplifiers 106 comprises a downstream gain element 220 and an upstream gain element 222. A gain of each of the upstream gain elements 222 may be dynamically controlled. In the scenario depicted in FIG. 2A, upstream gain element 222 of each of amplifier $106_1$ and $106_3$ are "on" (e.g., set to a value greater than 1) whereas a gain of upstream gain element 222 of amplifier $106_2$ is "off" (e.g., set to zero or to a value less than 1). Assuming for illustration purposes that, at the time instant shown, the signal from CM $112_1$ is a desired signal but the signals from CMs $112_2$-$112_5$ are noise, the configuration of FIG. 2A provides the advantage that interference with the desired signal from CMs $112_4$ and $112_5$ is substantially reduced as compared to gain element 222 of amplifier 1062 being "on." Nevertheless, the configuration of FIG. 2 does not reduce the interference with the desired signal cause by noise from CMs $112_2$ and $112_3$.

Figure 2A:
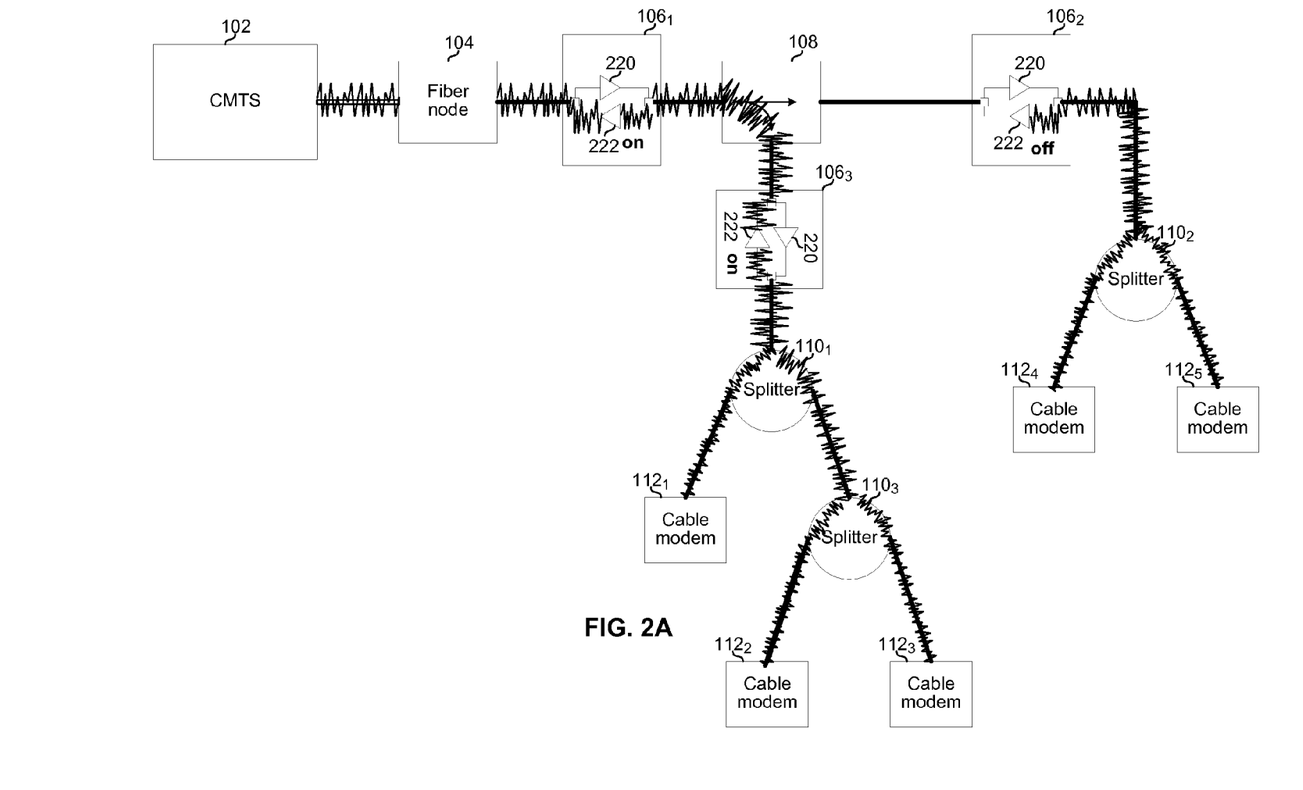
FIGS. 2A-2C depict example cable television networks comprising coupling devices operable to reduce noise in a cable/DOCSIS HFC network.
Figure 2B:
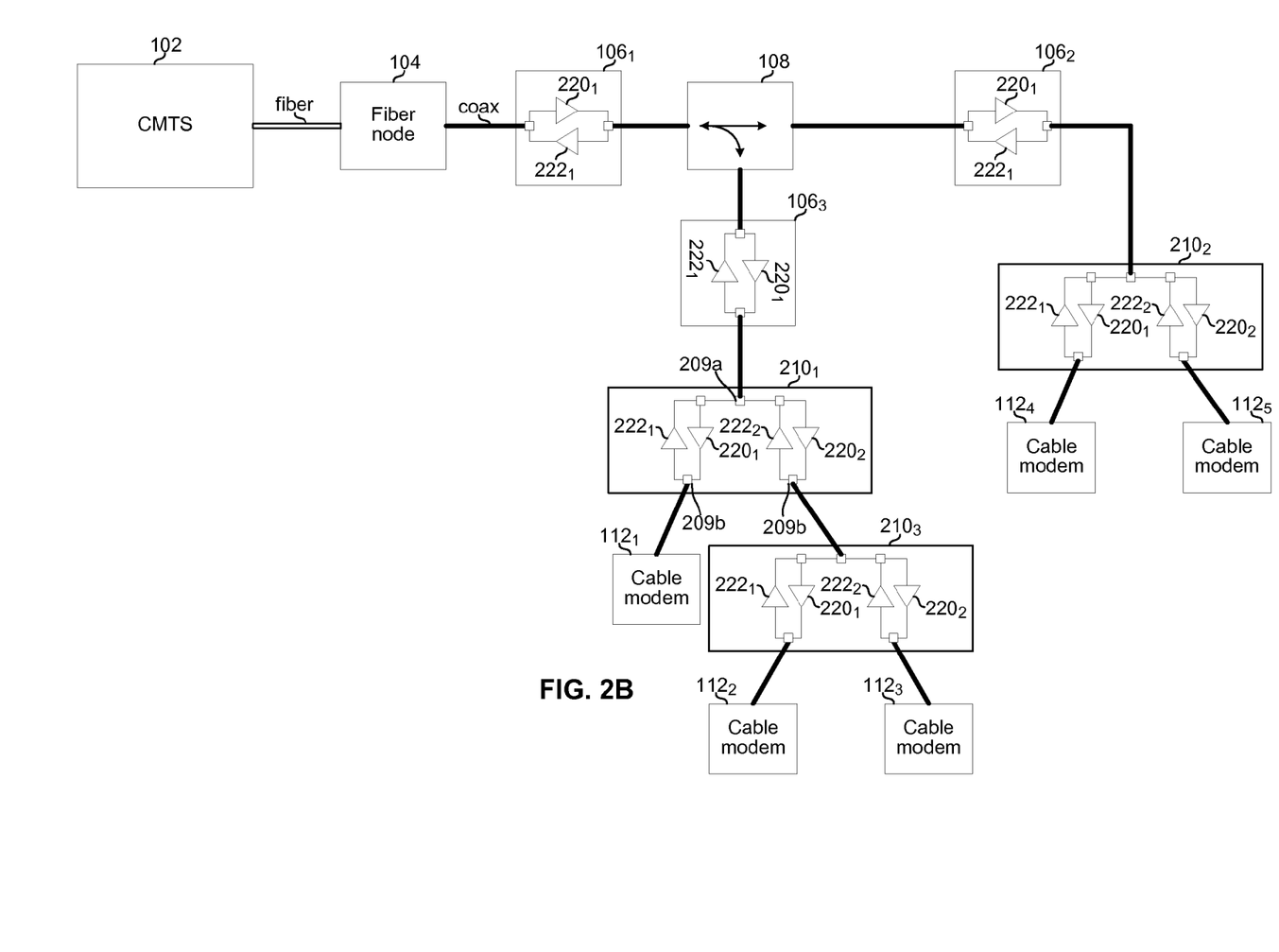
Figure 2C:
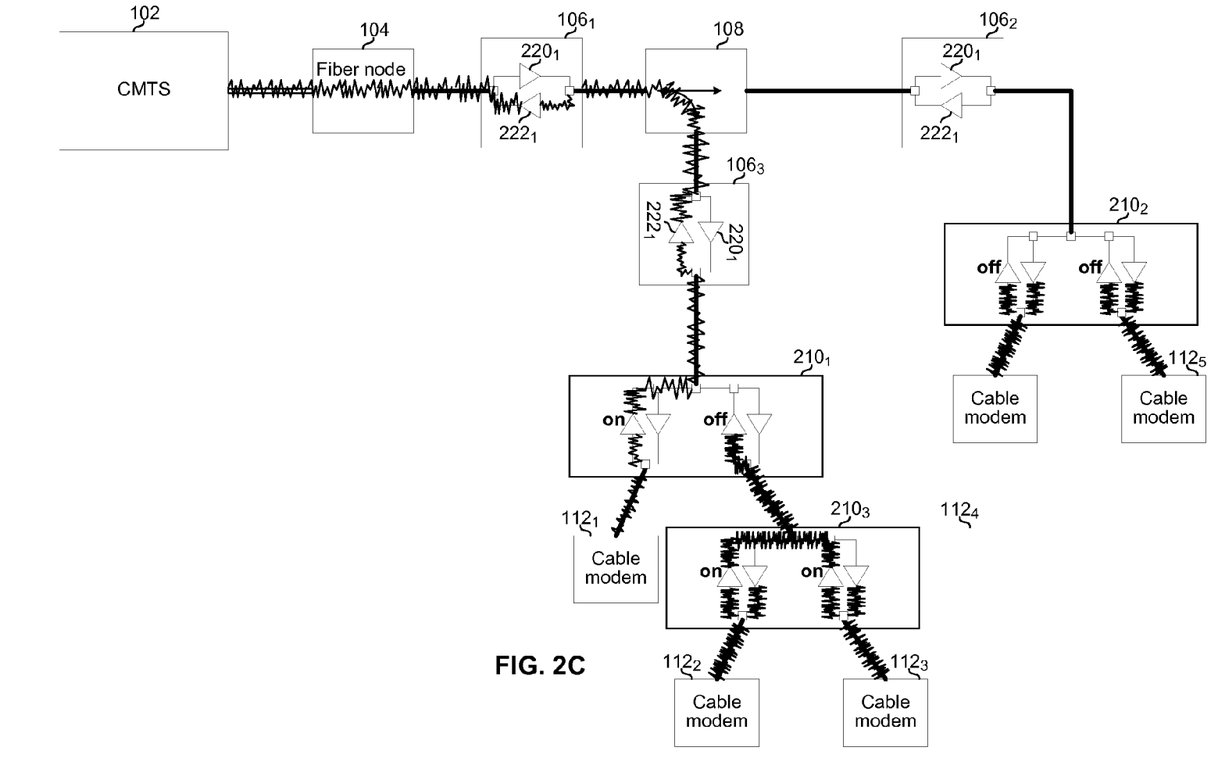

Referring to FIG. 2B, a network configuration is shown that provides additional reductions in interference relative to the network of FIG. 2A. In FIG. 2B, the passive splitters $110_1$-$110_3$ have been replaced by active coupling devices $210_1$-$210_3$. Each coupling device 210 comprises one upstream gain element 222 and one downstream gain element 220 per downstream interface of the coupling device 210 (for simplicity of illustration each of the coupling devices is shown as having two downstream interfaces). An example scenario illustrating the reduced interference in the configuration of FIG. 2B is shown in FIG. 2C.

Referring to FIG. 2C, again assuming that CM $112_1$ is transmitting and the other CMs $112_2$-$112_5$ are emitting only noise during the time instant shown, turning off gain element $222_2$ of device 210 reduces interference caused by noise from CMs $112_2$ and $112_3$. Similarly, in another time instant where CM$112_2$ is transmitting a desired signal (i.e., is the "talker" as a result of being granted access to the medium by the CMTS), then turning off all gain elements 222 other than $222_1$ of device $210_3$ may provide for low interference with the desired signal transmitted by CM $112_2$.

Figure 3A:
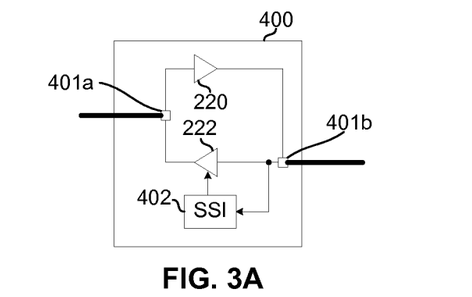
FIGS. 3A-3C illustrate exemplary implementations of a coupling device that is operable to reduce noise in a cable/DOCSIS HFC network.
Figure 3B:
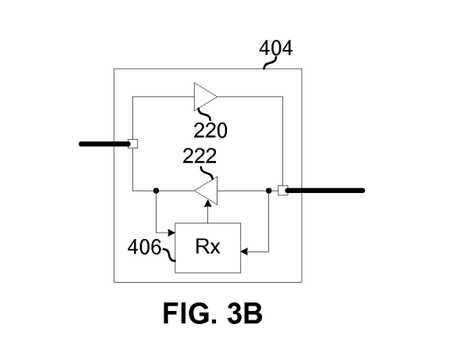
Figure 3C:
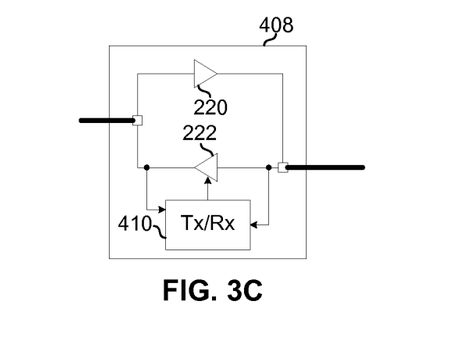

FIGS. 3A-3C illustrate exemplary implementations of a coupling device that is operable to reduce noise in a cable/DOCSIS HFC network. Each of the implementations 400, 404, and 408 shown in FIGS. 3A-3C, respectively, may represent any of the amplifiers $106_1$-$106_3$ and/or a portion of any of the devices $210_1$-$210_3$.

Referring to FIG. 3A, the device 400 comprises a signal strength indicator (SSI) 402 operable to detect signal strength of signals incident on the downstream interface 401b. In an example implementation, signal strength of upstream signals incident on the downstream interface 401b may be used for controlling the gain of gain element $222_1$ as described below with reference to FIG. 4A. In this manner, the device 400 may be operable to autonomously enable and disable an upstream path through the device 400 (the path through gain element 222) without the device 400 requiring additional circuitry (and thus complexity) as is present in the implementations of FIGS. 3B and 3C. For example, the SSI 402 may comprise entirely combinatorial logic or may comprise entirely passive elements (e.g., a simple envelope detector).

Referring to FIG. 3B, the implementation 404 comprises receiver circuit 406 which may be operable to receive instructions transmitted (e.g., by CMTS 102 and/or by one or more of CMs $112_1$-$112_5$) in accordance with a communication protocol selected by the operator of the HFC network. In an example implementation, the protocol may be a relatively-simple out-of-band physical layer signaling protocol. In another example implementation, the receiver 406 may be operable to implement a protocol stack (e.g., simple network management protocol stack). In another example implementation, the receiver 405 may be operable to implement a sufficient portion of the DOCSIS protocol stack that it is operable to monitor for, and upon detecting, inspect DOCSIS MAC management messages (e.g., upstream channel descriptors (UCDs), upstream bandwidth allocation messages (MAPs), and/or the like).

Referring to FIG. 3C, the implementation 408 comprises a transceiver circuit 410 which may be operable to both transmit and receive (e.g., for communicating with CMTS 102 and/or by one or more of CMs $112_1$-$112_5$) in accordance with a communication protocol selected by the operator of the HFC network. In an example implementation, the protocol may be a relatively-simple out-of-band physical layer signaling protocol. In another example implementation, the transceiver 410 may be operable to implement a protocol stack (e.g., simple network management protocol stack).

While the implementation of FIG. 3A has the advantage of simplicity both in terms of the complexity of the circuitry and in terms of management protocols, the example implementations of FIGS. 3B and 3C may have the advantage of controlling gain elements 222 based on higher-layer intelligence (e.g., determined and communicated by CMTS 102). For example, gain elements may be controlled based on the service group(s) downstream from them. To illustrate, referring back to FIG. 2A and assuming that CMs $112_1$-$112_3$ are part of a first service group and CMs 112₄ and 112₅ are part of a second service group, a control message may be sent to all receivers 406/410 in the network informing them as to which timeslots will be used by the first service group and which timeslots will be used by the second service group. Using this information, the receivers 406/410 can then enable and disable their respective gain elements 222 based on the current time, rather than having to wait and sense signal strength. This may reduce or eliminate the need for additional preambles or other physical layer signaling that may be required for device 400 to prevent interference from leaking through a not-yet-disabled upstream path, and/or to prevent desired signals from colliding with a not-yet-enabled upstream path. Such service-group-based control of gain elements 222 may be particularly useful where the CMs 112₁-112₅ have been assigned to service groups based on their location within the HFC network (e.g., where a particular device 406/410 handles only CMs of a particular service group, an upstream path through that particular device 406/410 can be disabled whenever the talker is not part of that particular service group).

Similar to the service-group based control of gain elements 222, another example implementation may perform CM based control of gain elements 222. That is, each gain element 222 may be enabled based on which particular CM that is transmitting (or will be transmitting). The service group based implementation may use a look-up table (e.g., stored in receiver 406 or 410) that indicates which element(s) 222 should be enabled for each service group. Similarly, the CM based implementation may use a look-up table that indicates which element(s) 222 should be enabled for each CM.

In an example implementation, the CMTS 104 may determine which of the CMs 112₁-112₅ are handled by which of the devices 106₁-106₃ and/or by which of the devices 210₁-210₃. This determination may be based on channel sounding techniques. In another example implementation, the CMTS 102 may communicate with a server that stores subscriber information that associates the CMs 112₁-112₅ with their respective geographic locations, such that the locations of the CMs 112₁-112₅ within the HFC network can be determined, and, in turn, which device(S) 106 and/or 210 amplifier(s) serve(s) which of the CMs 112₁-112₅ may be determined.

Figure 4A:
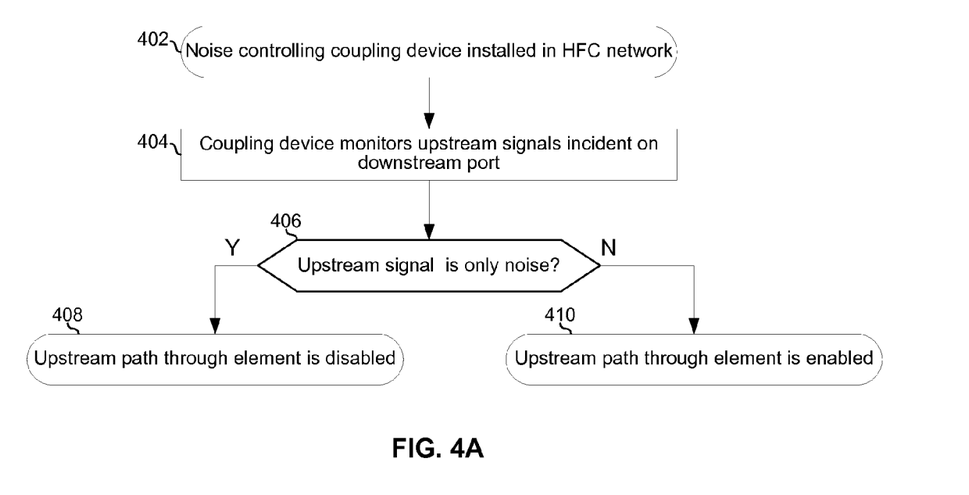
FIG. 4A is a flowchart illustrating an example process for controlling noise in a cable/DOCSIS HFC network.

FIG. 4A is a flowchart illustrating an example process for controlling noise in a cable/DOCSIS HFC network. The process begins with block 4020 in which a noise-controlling coupling device (e.g., 106 or 210) is installed in a HFC network. In block 4040, the coupling device monitors one or more characteristic(s) of an upstream signal incident on one or more of its downstream interfaces. The monitoring may comprise, for example, measuring average signal strength, peak-to-average signal strength, burst length, and/or any other suitable characteristics of the upstream signal(s). In block 4060, the coupling device determines, based on the characteristic(s) of the signals, whether the incident signal comprises a desired signal or whether the incident signal consists entirely of noise. If the signal is all noise, then in block 4080 a corresponding upstream path through the coupling device is disabled. If the signal contains a desired signal, then in block 4100 the corresponding path through the coupling device is enabled. The block 4060 and either 4080 or 4100 may be performed for each downstream interface of the coupling device.

Figure 4B:
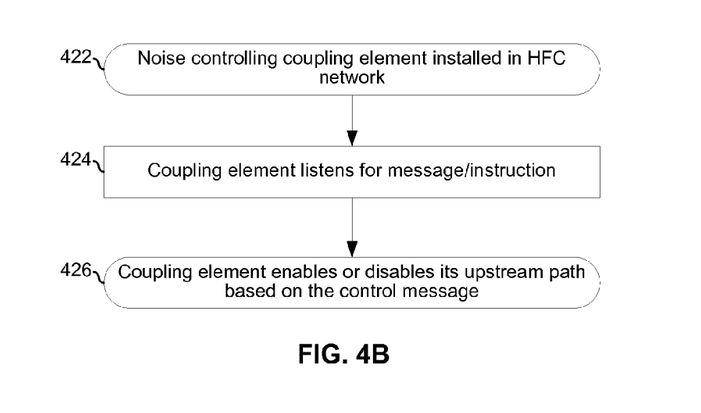
FIG. 4B is a flowchart illustrating an example process for controlling noise in a cable/DOCSIS HFC network.

FIG. 4B is a flowchart illustrating an example process for controlling noise in a cable/DOCSIS HFC network. The process begins with block 422 in which a noise-controlling coupling device (e.g., 106 or 210) is installed in a HFC network. In block 424, a receiver of the coupling device listens for messages that provide instructions as to which upstream paths to enable and which to disable. In an example implementation, the receiver may listen for management messages specified in an applicable standard (e.g., MAP, UCD, and/or other messages specified in a DOCSIS standard). In an example implementation, the receiver may listen for control messages sent for the specific purpose of controlling gain elements in coupling devices throughout a HFC network. The control messages may be in accordance with a protocol specifically designed for such management or may be in accordance with a more general network management protocol such as SNMP. In block 426, in response to the coupling device detecting a management message, it may enable one or more of its upstream paths and/or disable one or more of its upstream paths.

Figure 5:
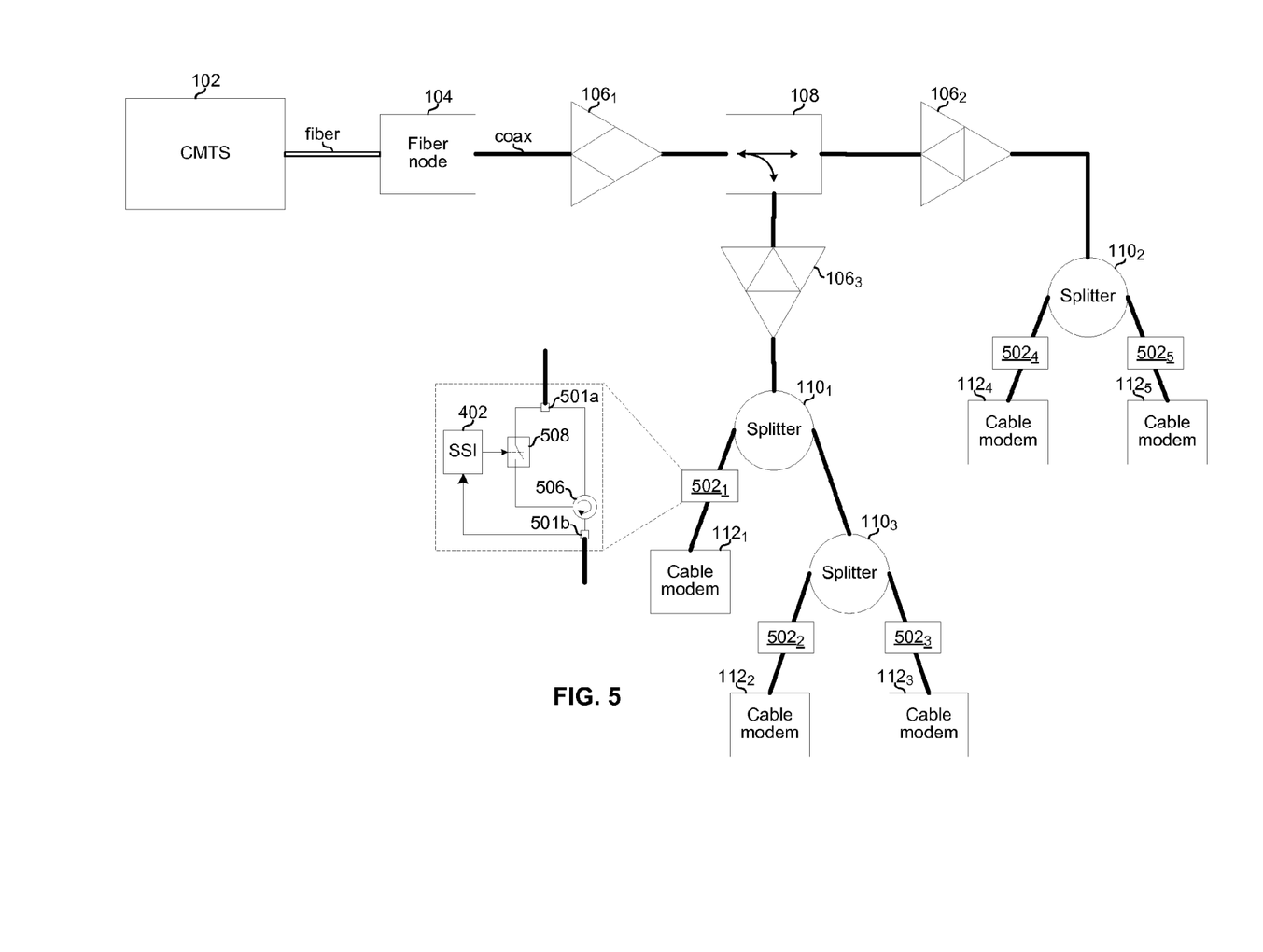
FIG. 5 shows a cable/DOCSIS HFC network comprising passive coupling devices that reduce noise in a network.

FIG. 5 shows a cable/DOCSIS HFC network comprising passive coupling devices that reduce noise in a network. Shown is the example network of FIG. 1, but the example network additionally comprises coupling devices 502₁-502₅. An example implementation of the devices 502 is shown and comprises a signal strength indicator (SSI), a circulator 506, and a switch 508.

As downstream traffic enters a device 502 via upstream interface 501a, the circulator 506 directs the downstream traffic out to interface 501b. As upstream traffic enters the device 502, the circulator 506 directs it to the signal path comprising switch 508. If switch 508 is open, the upstream path is prevented from getting onto interface 501a. The switch 508 may be opened and closed in any of the manners discussed above regarding controlling gain of gain element 222. For example, the switch 508 may be opened and closed based on signal strength measured by SSI 402, as shown.

Although, the coupling devices 502 are shown as having a single downstream port, they may have any number of downstream interfaces (e.g., two downstream interfaces) and may be used in much the same manner as devices 210 shown in FIGS. 2B and 2C.

In an example implementation of this disclosure, a coupling device (e.g., 106, 110, or 502) for use in a hybrid fiber coaxial (HFC) network may be configured to disable an upstream path through it (e.g., path including a gain element 222 or switch 508) when there is only noise incident on the upstream path, and enable the upstream path through it when a desired transmission from a cable modem downstream of the coupling device is incident on the upstream path. The coupling device may be a trunk amplifier (e.g., 106₁), a distribution amplifier (e.g., 106₃), a splitter (e.g., 210₁), or the like. The coupling device may comprise a single upstream interface (e.g., 209a) coupled to a plurality of downstream interfaces (e.g., 209b). The coupling device may comprise a signal strength indicator (SSI) (e.g., 402). The disabling may be in response to a signal strength indicated by the SSI being below a threshold. The enabling may be in response to the signal strength indicated by the SSI being above the threshold. The coupling device may be operable to detect control messages in the HFC network. The disable may be in response to one or more control messages (e.g., exchanged in accordance with a coupling device control protocol) indicating that a cable modem downstream of the coupling device is, or will be at some determined time in the future, transmitting. The enable may be in response to one or more control messages (e.g., exchanged in accordance with a coupling device control protocol) indicating that a cable modem downstream of the coupling device is, or will be at some determined time in the future, transmitting. The control message may indicate a service group of which a cable modem is, or will be at some determined time in the future, transmitting. The coupling device may comprise a pair of cross-coupled gain elements (e.g., 220 and 222) for each downstream interface. The coupling device may comprise a switching element (e.g., 508) and a circulator (e.g., 506). The circuitry may comprise a switch and the disabling may comprise opening the switch. The circuitry may comprise an amplifier and the disabling may comprise reducing a gain of the amplifier.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform processes as described herein.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
   a coupling device for use in a hybrid fiber coaxial (HFC) network, said coupling device configured to:
      detect control messages in said HFC network;
      disable an upstream path through said coupling device when there is only noise incident on said upstream path, wherein said disable is in response to one or more of said control messages that indicates that no cable modem downstream of said coupling device is, nor will be for some determined time in the future, transmitting; and
      enable said upstream path through said coupling device when a desired transmission from a cable modem downstream of said coupling device is incident on said upstream path, wherein said enable is in response to one or more of said control messages that indicates that a cable modem downstream of said coupling device is, or will be at some determined time in the future, transmitting.

2. The system of claim 1, wherein said coupling device is a trunk or distribution amplifier.

3. The system of claim 1, wherein said coupling device comprises a single upstream interface coupled to a plurality of downstream interfaces.

4. The system of claim 1, wherein:
   said coupling device comprises a signal strength indicator (SSI);
   said disable is in response to signal strength indicated by said SSI being below a threshold;
   said enable is in response to said signal strength indicated by said SSI being above said threshold.

5. The system of claim 1, wherein one of said control messages indicates a service group of a cable modem that is, or will be at some determined time in the future, transmitting.

6. The system of claim 1, wherein one of said control messages comprises an indication of a service group of a cable modem that is, or will be at some determined time in the future, transmitting.

7. The system of claim 1, wherein said coupling device comprises a switching element and a circulator.

8. The system of claim 1, wherein said coupling device comprises a switch and said disable comprises opening of said switch.

9. The system of claim 1, wherein said coupling device comprises an amplifier and said disable comprises a reducing of a gain of said amplifier.

10. A method comprising:
    performing in a coupling device of a hybrid fiber coaxial (HFC) network:
       detecting control messages in said HFC network;
       disabling an upstream path through said coupling device when there is only noise incident on said upstream path, wherein said disabling is in response to one or more of said control messages indicating that no cable modem downstream of said coupling device is, nor will be for some determined time in the future, transmitting; and
       enabling said upstream path through said coupling device when a desired transmission from a cable modem downstream of said coupling device is incident on said upstream path, wherein said enabling is in response to one or more of said control messages indicating that a cable modem downstream of said coupling device is, or will be at some determined time in the future, transmitting.

11. The method of claim 10, wherein said coupling device is a trunk or distribution amplifier.

12. The method of claim 10, wherein said coupling device comprises a single upstream interface coupled to a plurality of downstream interfaces.

13. The method of claim 10, wherein:
    said coupling device comprises a signal strength indicator (SSI);
    said disabling is in response to signal strength indicated by said SSI being below a threshold;
    said enabling is in response to said signal strength indicated by said SSI being above said threshold.

14. The method of claim 10, wherein one of said control messages indicates a service group of said cable modem that is, or will be at some determined time in the future, transmitting.

15. The method of claim 10, wherein said coupling device comprises a pair of cross-coupled amplifiers for each downstream interface.

16. The method of claim 10, wherein said coupling device comprises a switching element and a circulator.

17. The method of claim 10, wherein said coupling device comprises a switch and said disabling comprises opening said switch.

18. The method of claim 10, wherein said coupling device comprises an amplifier and said disabling comprises reducing a gain of said amplifier.

* * * * *